(12) United States Patent
Meinert

(10) Patent No.: US 7,429,071 B2
(45) Date of Patent: Sep. 30, 2008

(54) CONVERTIBLE

(75) Inventor: Stefan Meinert, Wallenhorst (DE)

(73) Assignee: Wilhelm Karmann GmbH, Osnabrueck (DE)

( * ) Notice: Subject to any disclaimer, the term of this patent is extended or adjusted under 35 U.S.C. 154(b) by 0 days.

(21) Appl. No.: 10/599,485

(22) PCT Filed: Mar. 17, 2005

(86) PCT No.: PCT/DE2005/000487

§ 371 (c)(1),
(2), (4) Date: Jan. 12, 2007

(87) PCT Pub. No.: WO2005/095134

PCT Pub. Date: Oct. 13, 2005

(65) Prior Publication Data

US 2008/0018132 A1    Jan. 24, 2008

(30) Foreign Application Priority Data

Mar. 29, 2004  (DE) ............. 10-2004-015-705
Oct. 1, 2004   (DE) ............. 10-2004-047-872

(51) Int. Cl.
*B60J 7/12* (2006.01)

(52) U.S. Cl. ............. 296/107.15; 296/107.07; 296/107.08

(58) Field of Classification Search ......... 296/116, 296/117, 107.07, 107.08, 107.15, 107.16
See application file for complete search history.

(56) References Cited

U.S. PATENT DOCUMENTS

| | | | | |
|---|---|---|---|---|
| 3,188,135 A * | 6/1965 | Bernstein et al. | ............ | 296/117 |
| 6,283,532 B1 * | 9/2001 | Neubrand | ............ | 296/107.07 |
| 6,422,637 B1 * | 7/2002 | Mac Farland | .......... | 296/107.15 |
| 6,485,085 B1 * | 11/2002 | Pecho et al. | ........... | 296/107.07 |
| 6,513,857 B2 * | 2/2003 | Pfertner et al. | ......... | 296/107.07 |
| 6,578,898 B2 * | 6/2003 | Rothe et al. | ............ | 296/107.07 |
| 6,722,724 B1 * | 4/2004 | MacFarland | ........... | 296/107.17 |
| 7,118,161 B2 * | 10/2006 | Neubrand | ............. | 296/107.15 |
| 7,175,225 B2 * | 2/2007 | Hofers et al. | .......... | 296/107.01 |
| 2002/0074822 A1 * | 6/2002 | Rothe et al. | ............ | 296/107.07 |
| 2003/0146642 A1 * | 8/2003 | Mandl et al. | ........... | 296/107.12 |
| 2004/0080178 A1 * | 4/2004 | Klein et al. | ............ | 296/107.08 |
| 2004/0084929 A1 * | 5/2004 | Neubrand | ............. | 296/107.15 |
| 2007/0194596 A1 * | 8/2007 | Heselhaus | ............. | 296/107.07 |

FOREIGN PATENT DOCUMENTS

DE        19846006 A1 *  4/2000

OTHER PUBLICATIONS

Machine Translation of the Detailed Description section of DE 19846006 from the European Patent Office website, printed May 12, 2008.*

* cited by examiner

*Primary Examiner*—Jason S Morrow
(74) *Attorney, Agent, or Firm*—Quinn Law Group, PLLC; Christopher W. Quinn

(57) ABSTRACT

A convertible vehicle with at least one front roof area, having a flexible covering in the direction of travel, and a rigid roof area, including a rear window. The front roof area includes several lateral frame parts lying one behind the other, which can be folded opposite to each other, at least in the essentially horizontal axes, and can be covered by the rear roof area in the stored position.

18 Claims, 18 Drawing Sheets

CONVERTIBLE

CROSS-REFERENCE TO RELATED APPLICATION(S)

This application is a US National Phase of International Application No. PCT/DE 2005/000487, filed Mar. 17, 2005, which claims priority to German 10 2004 01, filed Mar. 29, 2004, and German 10 2004 04, filed Oct. 1, 2004. The entire contents of the above identified applications are incorporated herein by reference.

TECHNICAL FIELD

The invention relates to a convertible vehicle with at least one flexible front and one rigid rear area.

BACKGROUND OF THE INVENTION

DE 101 40 232 A1 shows a convertible vehicle with a rigid rear roof part and a flexible roof area connected to it in the direction of travel, which includes a roof covering supported by several transverse convertible-top bows. The convertible-top bows are connected to each other in a known manner by lateral frame parts. These frame parts are pivoted around vertical axes opposite to each other for opening the flexible roof area. Several drives arranged on the corresponding longitudinal sides of the vehicle are used for this purpose. In order to guarantee uniform shortening of the roof area in the opening phase, these must be synchronized with each other, which is expensive. In addition, the folding mechanism of the side frame parts shown is complicated, and additional steps must be taken in order to avoid uncontrolled unfolding of the roof covering and jamming in the joint areas.

SUMMARY OF THE INVENTION

The invention is based on the problem of optimizing a convertible vehicle of the type mentioned with respect to opening motion of the flexible roof area.

The invention solves this problem with a convertible vehicle having a front roof area that includes several lateral frame parts lying one behind the other, which can be folded toward each other, at least in essentially horizontal axes, and can be covered by a rear roof area in a stored position and a convertible vehicle where a front roof area has several lateral frame parts lying one behind the other, and the rearmost lateral frame part is a component of a rigid rear roof area, which can be implemented individually or in combination with each other. Advantageous embodiments of the object of the invention can be seen throughout the Claims.

Through the design, a conventional folding mechanism is created in the front roof area, which has long been known in fully flexible convertible tops and is therefore easy to handle. Through the foldability of the lateral frame parts, no synchronization problems are produced and the folded section already enters the position required for opening by its own weight. A situation is therefore prevented in which opposite longitudinal side areas are moved rearward at different speeds during roof opening, making the flexible roof area slanted.

Folding occurs particularly advantageously, in that a roof peak is not reversed in the opening position and therefore remains arched relative to the rear roof part in the same direction, beneath which it can be accommodated. The roof peak can then conform to the rear roof part very closely, so that a minimized packing dimension of the roof results.

In the design, the mechanism is simplified. By rigid connection of the rear lateral frame part to the rear rigid roof part, no separate movement mechanism need be provided for the lateral frame part. This frame part, which extends upward from the window parapet line and is often also referred to as the main column, can then be moved with the rigid rear roof part without its own drive or control requirements.

To avoid increased tensile stress on the covering, it is particularly helpful if at least one convertible-top bow lying in the rear area of the flexible roof area passes beneath the covering only when the roof is closed and is separated from it during roof opening. Folding of the covering can also be optimized in that during roof opening, it is positioned closely beneath the rear roof part, therefore in a space-saving manner.

Folding can be further improved if the covering remains firmly connected, in addition to the front roof peak, only to a convertible-top bow lying between the front frame parts, a convertible-top bow movable with respect to the lateral frame parts, and in the vicinity of the upper edge of the rear roof part during the entire roof movement.

A simplification of the control of the roof movement can be achieved if two different movement mechanisms are provided, on one hand, to move the rear roof area from its closed position into an intermediate position that permits opening of a cover part situated beneath it, and, on the other hand, to move the entire roof farther.

In particular, the control requirements are reduced if a drive device of the first movement mechanism remains deactivated in the second movement phase and serves only as a mechanical coupling.

Additional advantages and features of the invention can be seen from an embodiment example of the object of the invention, shown in the drawings and described below.

BRIEF DESCRIPTION OF THE DRAWINGS

In the drawings:

FIG. 1 through FIG. 9 show a complete process of roof opening in a schematic side view of the middle vehicle area, viewed from the inside, in which:

FIG. 1 shows the position in the closed roof with the rear cover part additionally shown, along with the front windshield frame and the roof covering, as well as the head-movement curves of the occupants, FIG. 2 shows a view similar to FIG. 1 during upward movement of the rear roof area with the front roof area still closed, FIG. 3 shows a view similar to FIG. 2 at the end of upward movement of the rear roof area, with a front roof area just opening and the cover part already opened to release a passage opening for the roof, FIG. 4 also shows a view similar to FIG. 3 at the beginning of the second movement phase, with opening of the front roof area, FIG. 5 shows a view similar to FIG. 4 as the roof opening proceeds, FIG. 6 shows a view similar to FIG. 5, with the roof opening proceeding further, shown without the rear cover part and other vehicle lines in the interest of clarity, FIG. 7 shows a view similar to FIG. 6, with the roof opening proceeding further, FIG. 8 shows a view similar to FIG. 7, with the roof opening proceeding further, FIG. 9 shows a view similar to FIG. 8 with the roof completely opened FIG. 10 to FIG. 18 show a complete process of roof opening in a schematic side view of the middle vehicle area, viewed from the outside, in which:

FIG. 10 shows the roof in the fully closed position with the rear cover part, front windshield frame, and roof covering, as well as head movement curves of the occupants shown additionally.

FIG. 11 shows the roof in the position according to FIG. 2, but without the covering being shown, FIG. 12 shows the roof in a view similar to FIG. 11, but at the end of the upward movement of the rear roof part and with the front roof part still closed, FIG. 13 shows the roof in a position similar to that of FIG. 4, FIG. 14 shows the roof in a position similar to that of FIG. 5, but, in the interest of clarity, without the cover part and additional body lines being shown, FIG. 15 shows the roof in a position similar to that of FIG. 6, FIG. 16 shows the roof in a position similar to that of FIG. 7, FIG. 17 shows the roof in a position similar to that of FIG. 8, FIG. 18 shows the roof in the position as in FIG. 9.

DESCRIPTION OF THE PREFERRED EMBODIMENTS

The convertible vehicle 1 according to the invention is shown schematically in the diagrams in its upper and middle areas, which include the passenger compartment 3. This can be covered by a movable roof 2, which is closed in the views according to FIG. 1 and FIG. 10.

Figure 6:
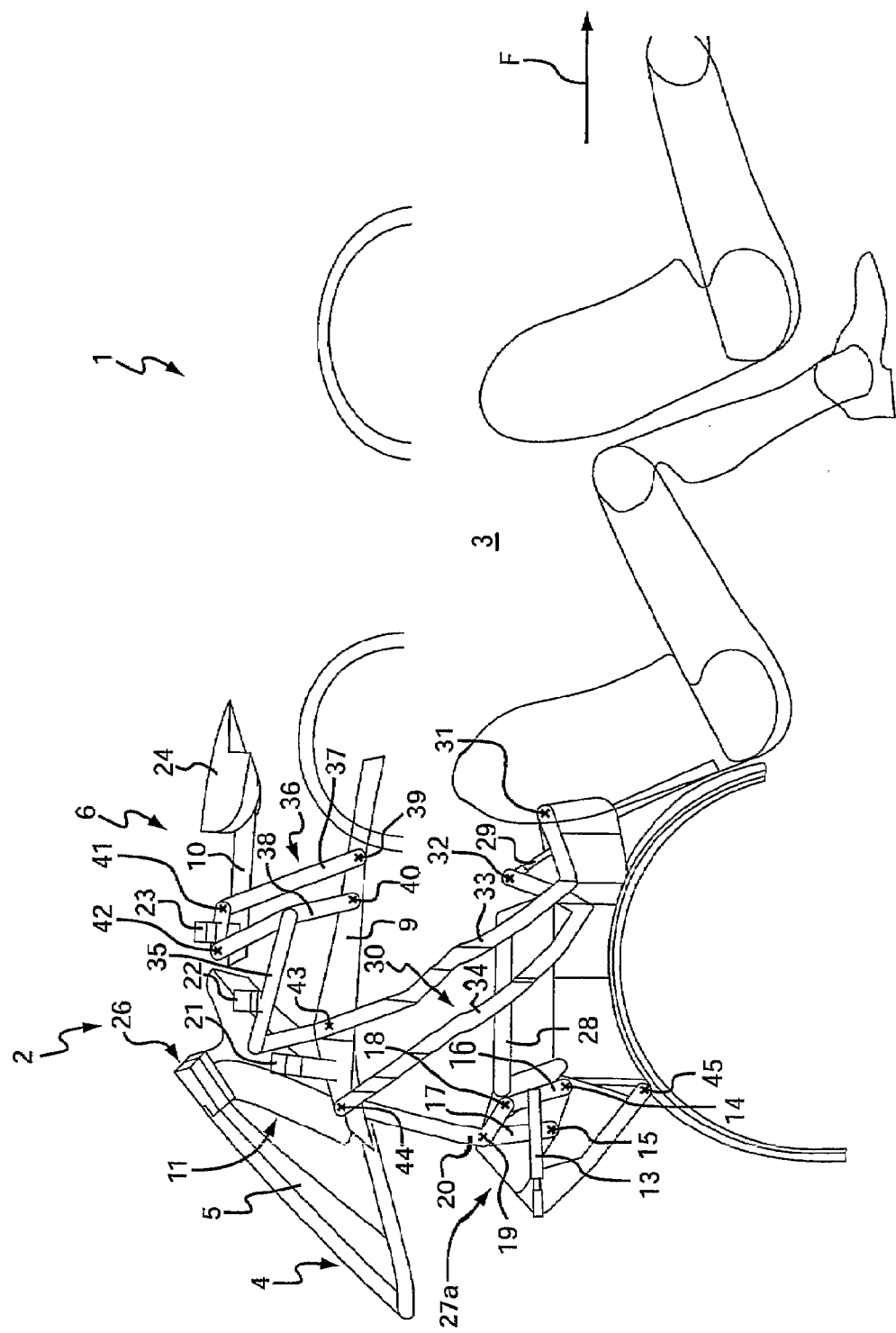
Figure 7:
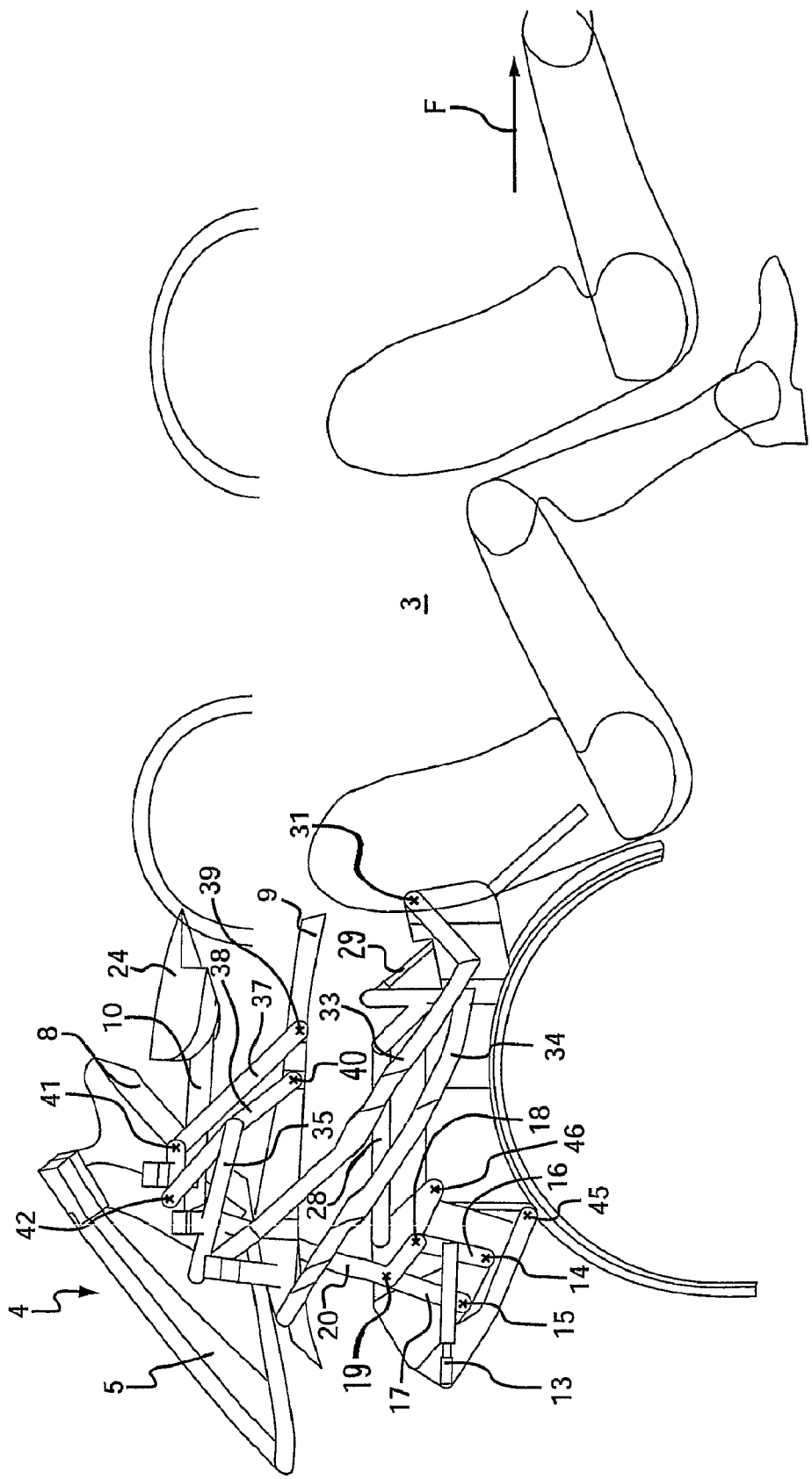
Figure 8:
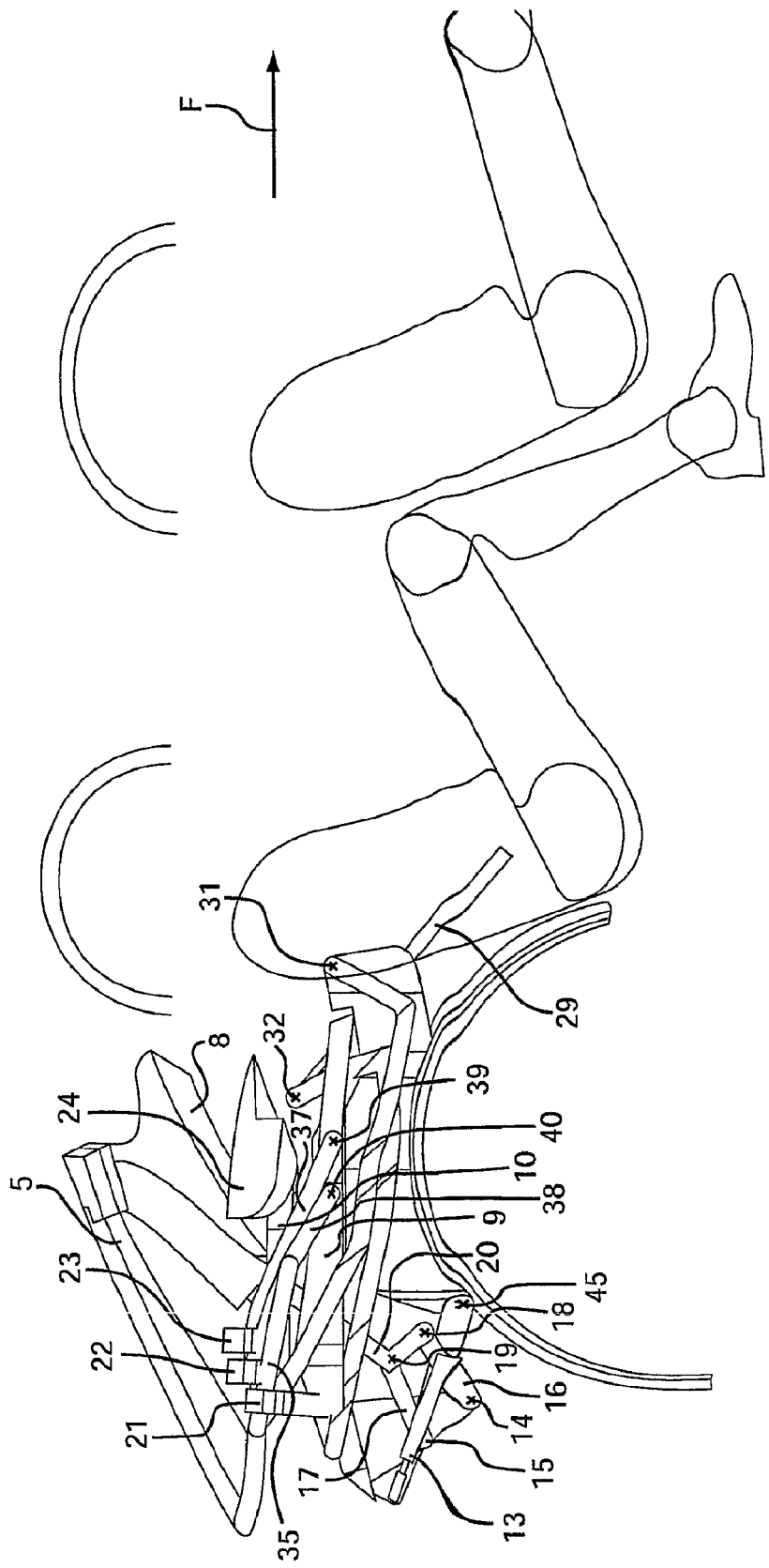

The roof 2 includes a rigid rear roof area 4, which is designed dome-like and includes an arched rear window 5, which can be provided with a light- and/or heat-absorbing coating outside of a center transparent area, and can extend with its transverse edge 11 (shown in FIG. 6) into the lateral transverse outer edges of dome-like rigid rear roof area 4. A particularly good view to the rear is made possible by this.

Figure 1:
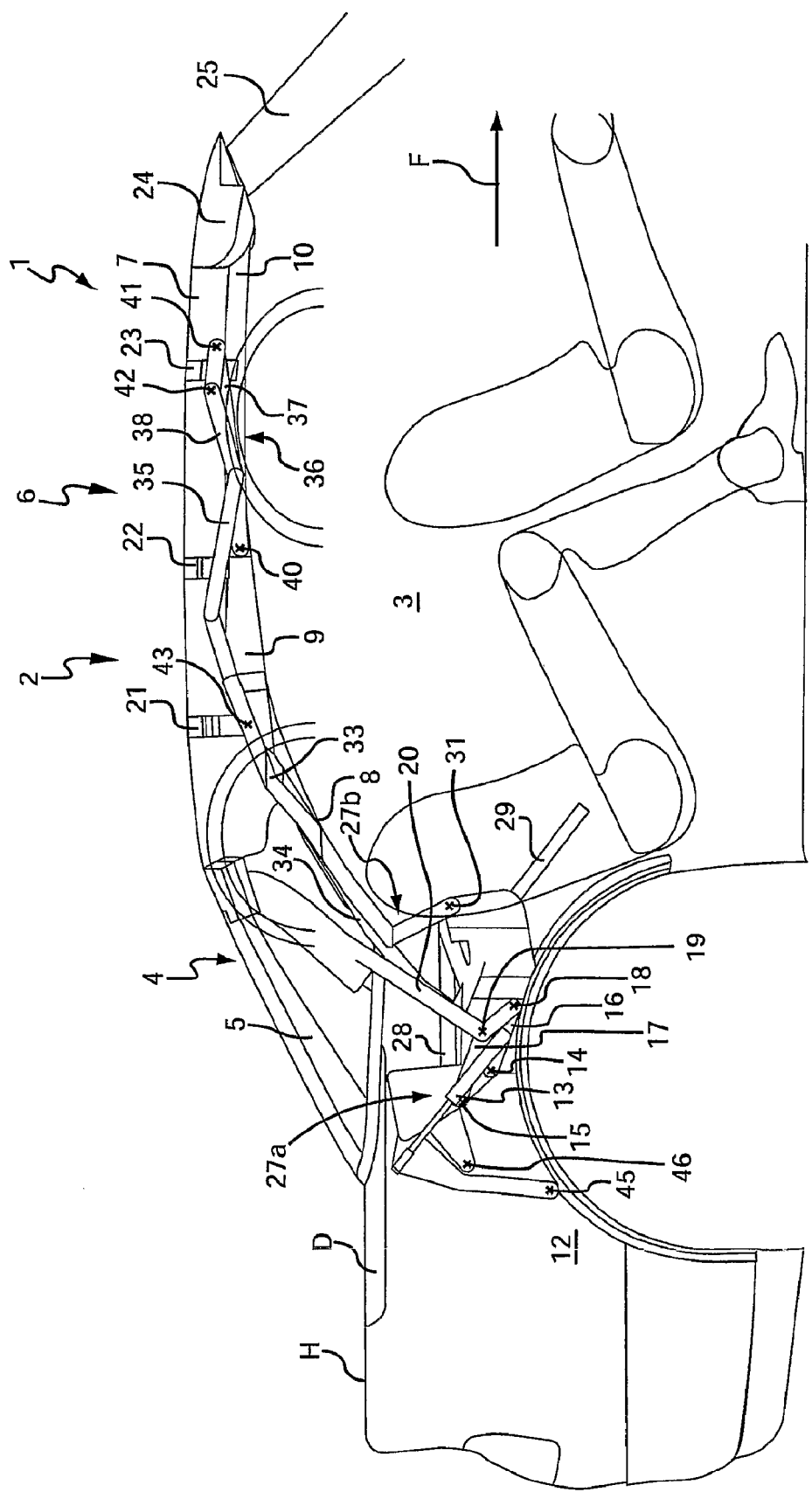
Figure 10:
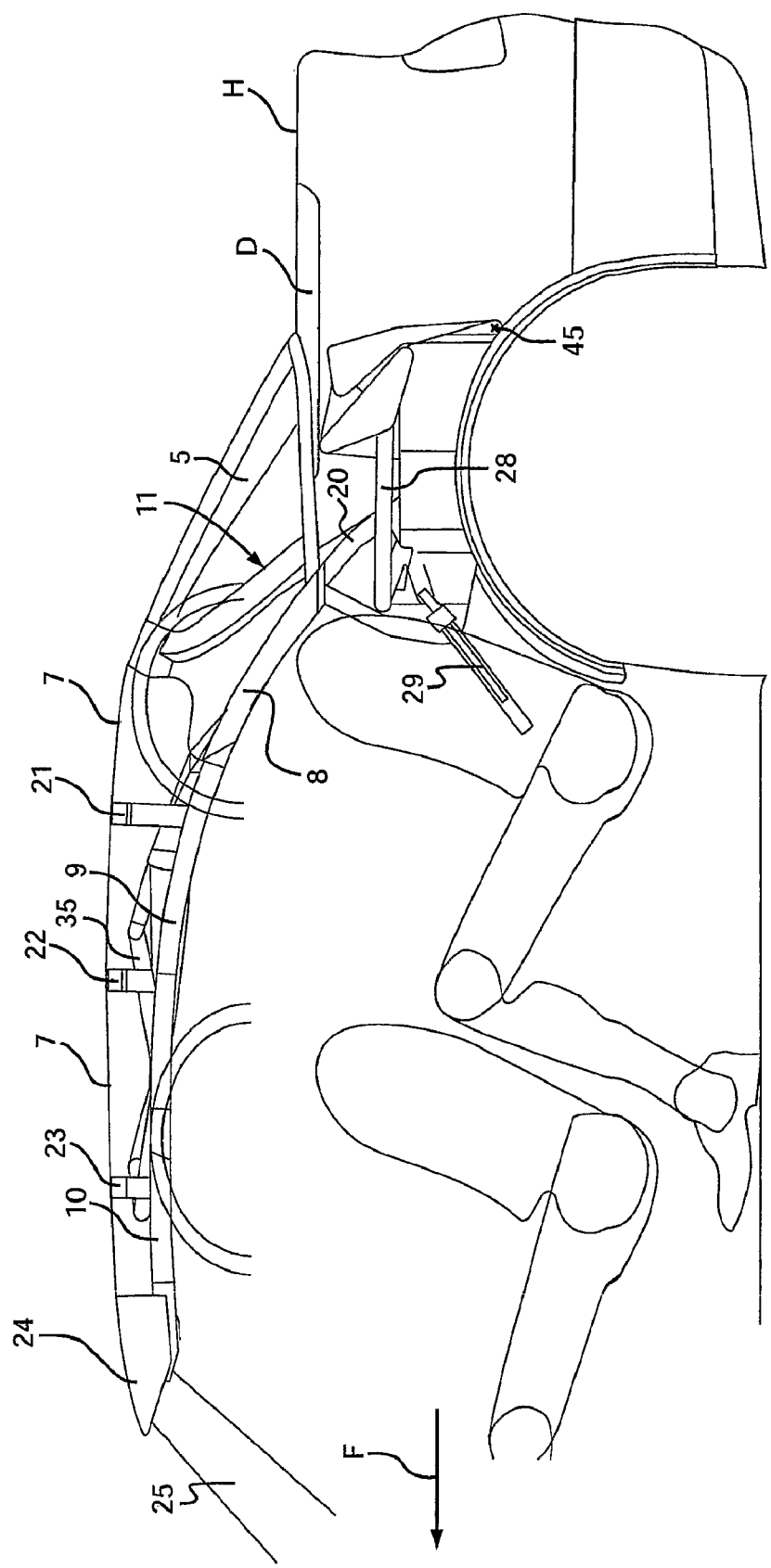

The roof 2 also includes a front roof area 6 spanned with a covering 7 (only shown in FIG. 1 and FIG. 10). Several (for example, three here) lateral frame parts, connected to each other in the closed position with respect to the direction of travel F and running in the longitudinal direction of the vehicle after frame parts 8, 9, 10, are used to span this covering 7. The conditions are the same on both sides of the vehicle in this respect.

The rearmost frame part 8 extends from a window parapet line upward. It is rigidly connected to the rear roof area 4 and can therefore be moved together with it. The frame part 8 can enclose an upward opening angle with the lateral edge 11 of rear window 5. The intermediate space between frame part 8 and the edge 11 of rear window 5 can be lined.

The rear roof area 4 is connected to the body 12 through a first movement mechanism 27a. This includes a drive device 13, designed here as a hydraulic cylinder, two links 16, 17 mounted to pivot on an A-arm by means of articulations 14, 15, which are connected to additional articulations 18, 19 with a lever 20 that rigidly engages on the rear roof area 4. The first movement mechanism therefore includes a four-link suspension 14, 15, 18, 19 to move the rear roof area 4. In the first movement phase, the A-arm is not moved with respect to the body 12.

Figure 3:
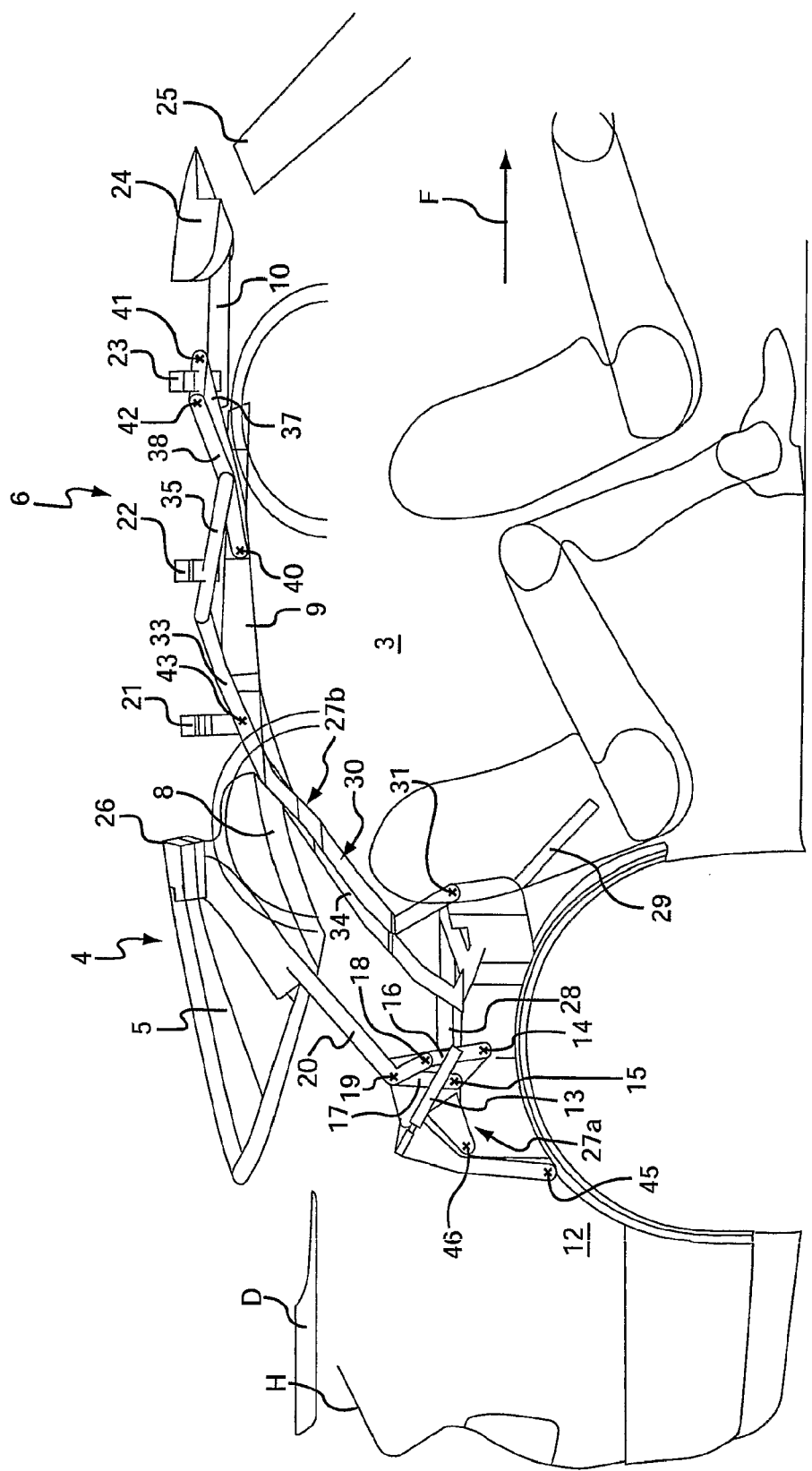
Figure 4:
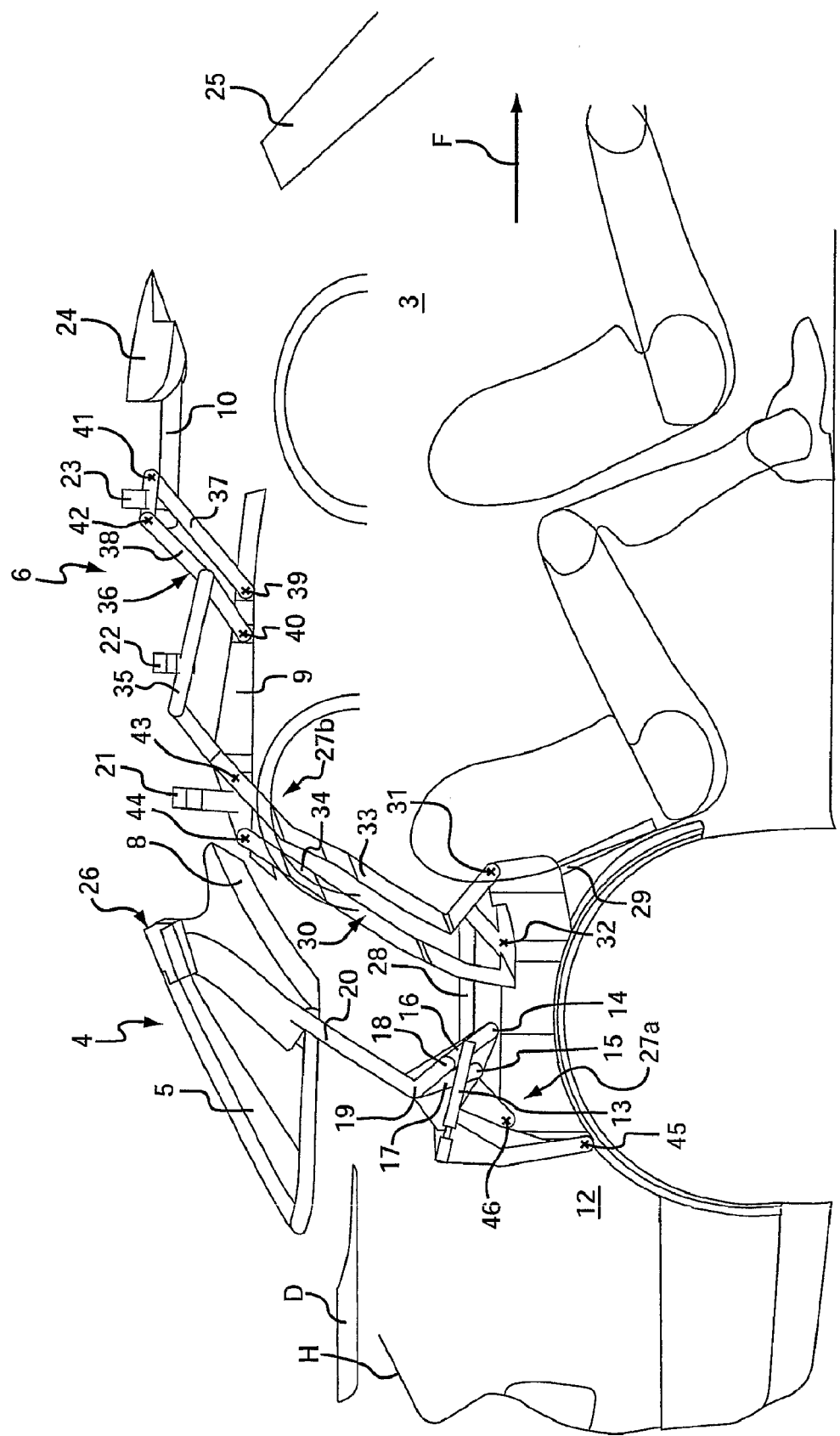
Figure 5:
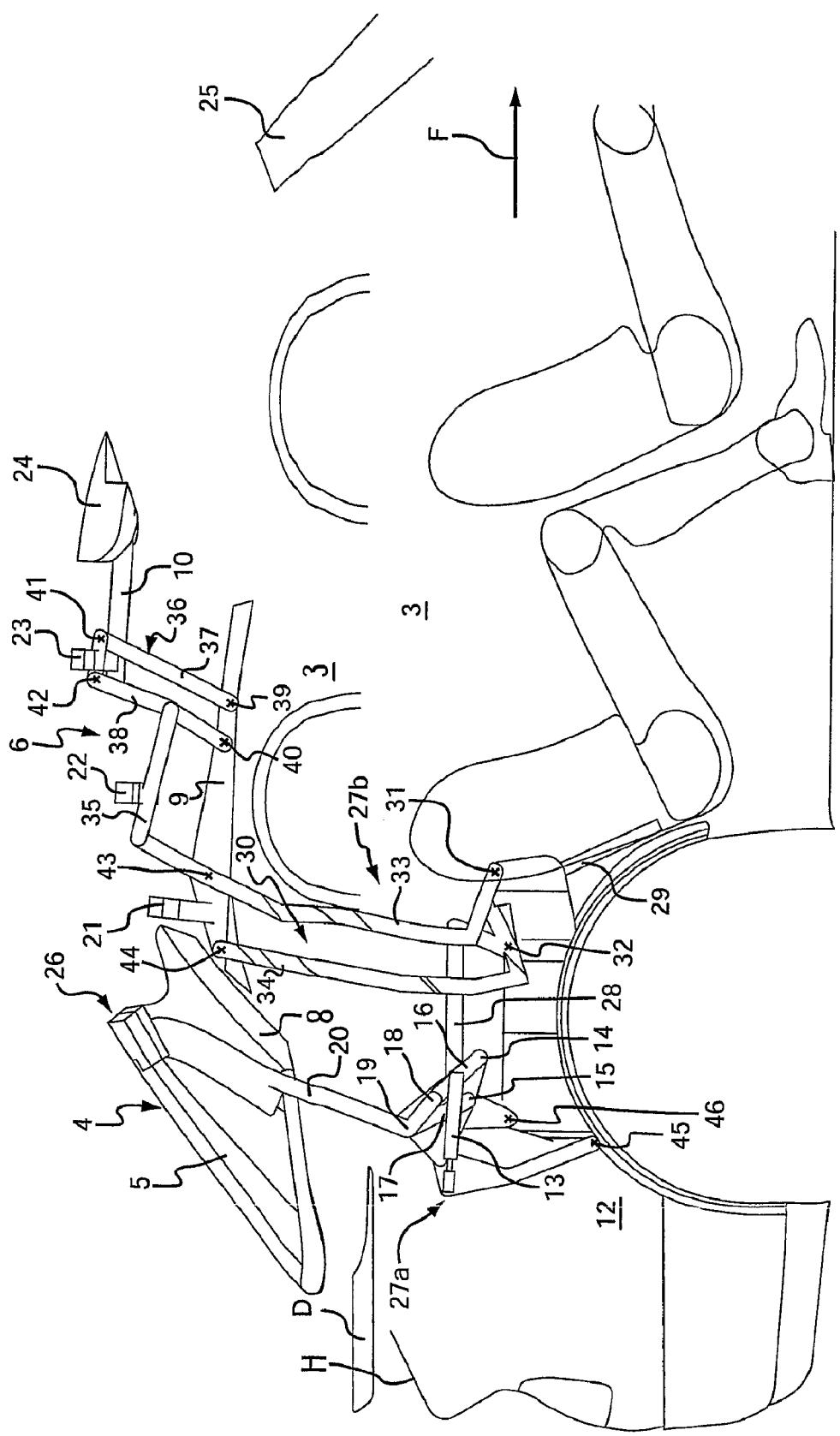
Figure 12:
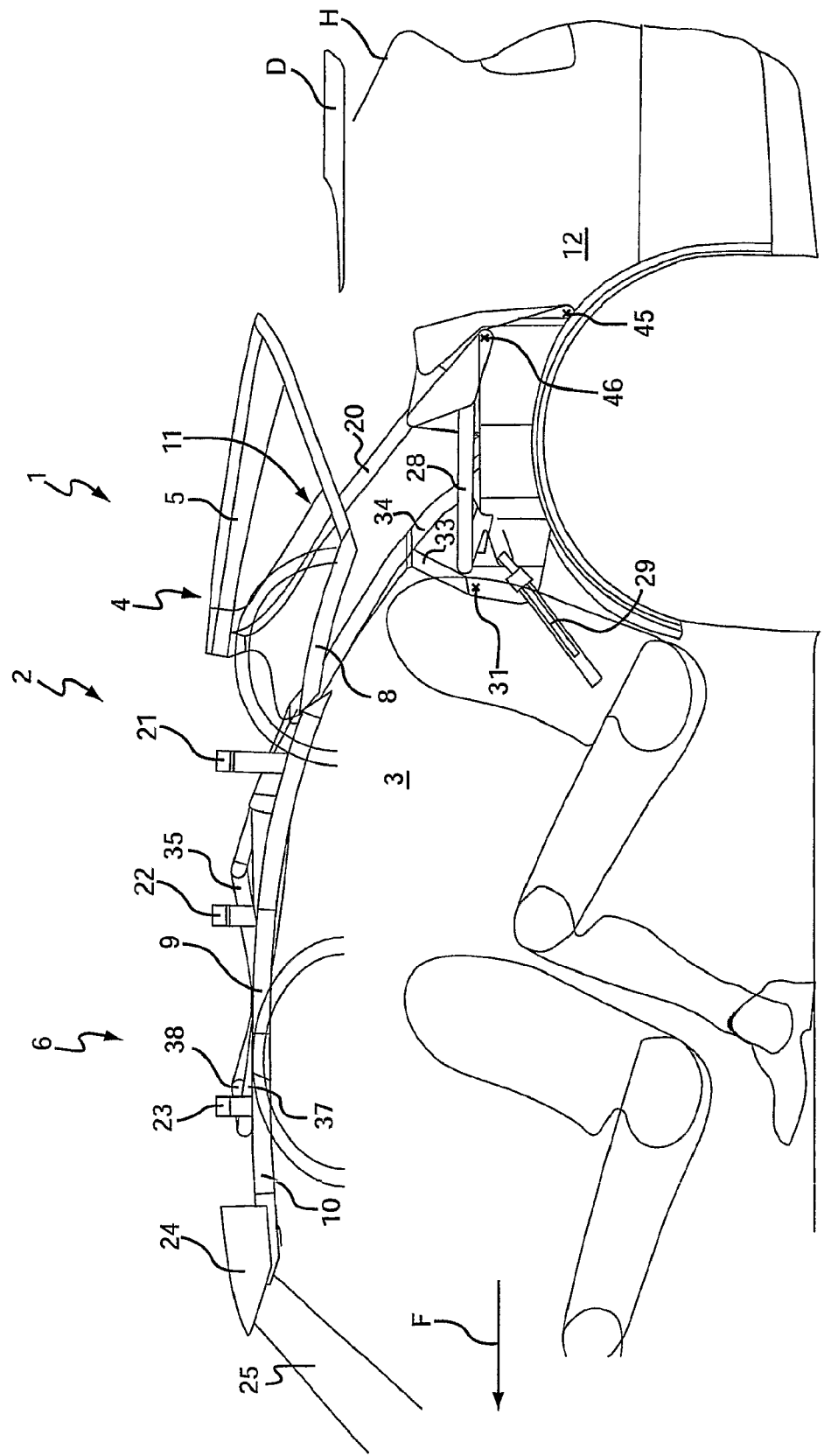
Figure 13:
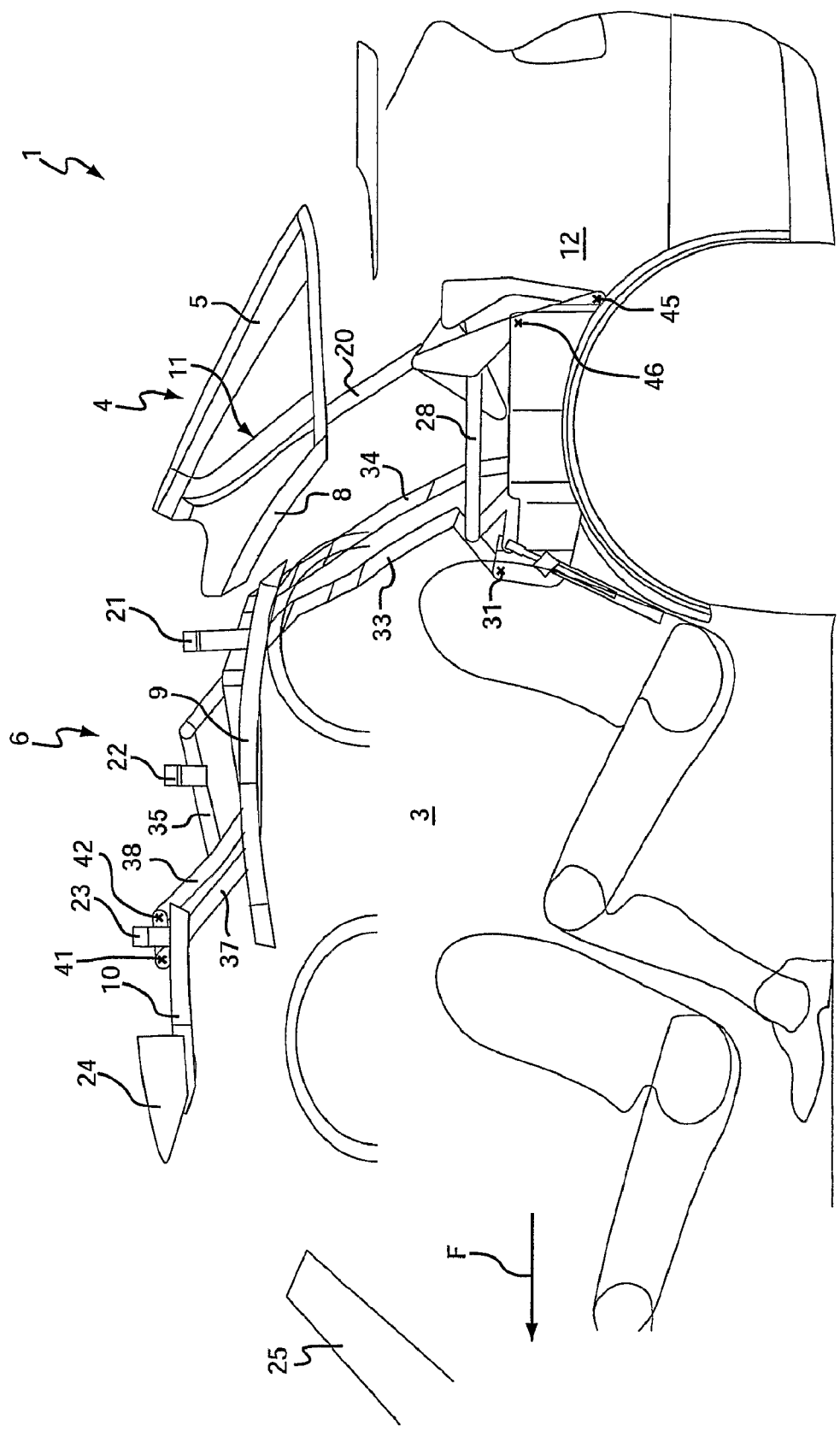
Figure 14:
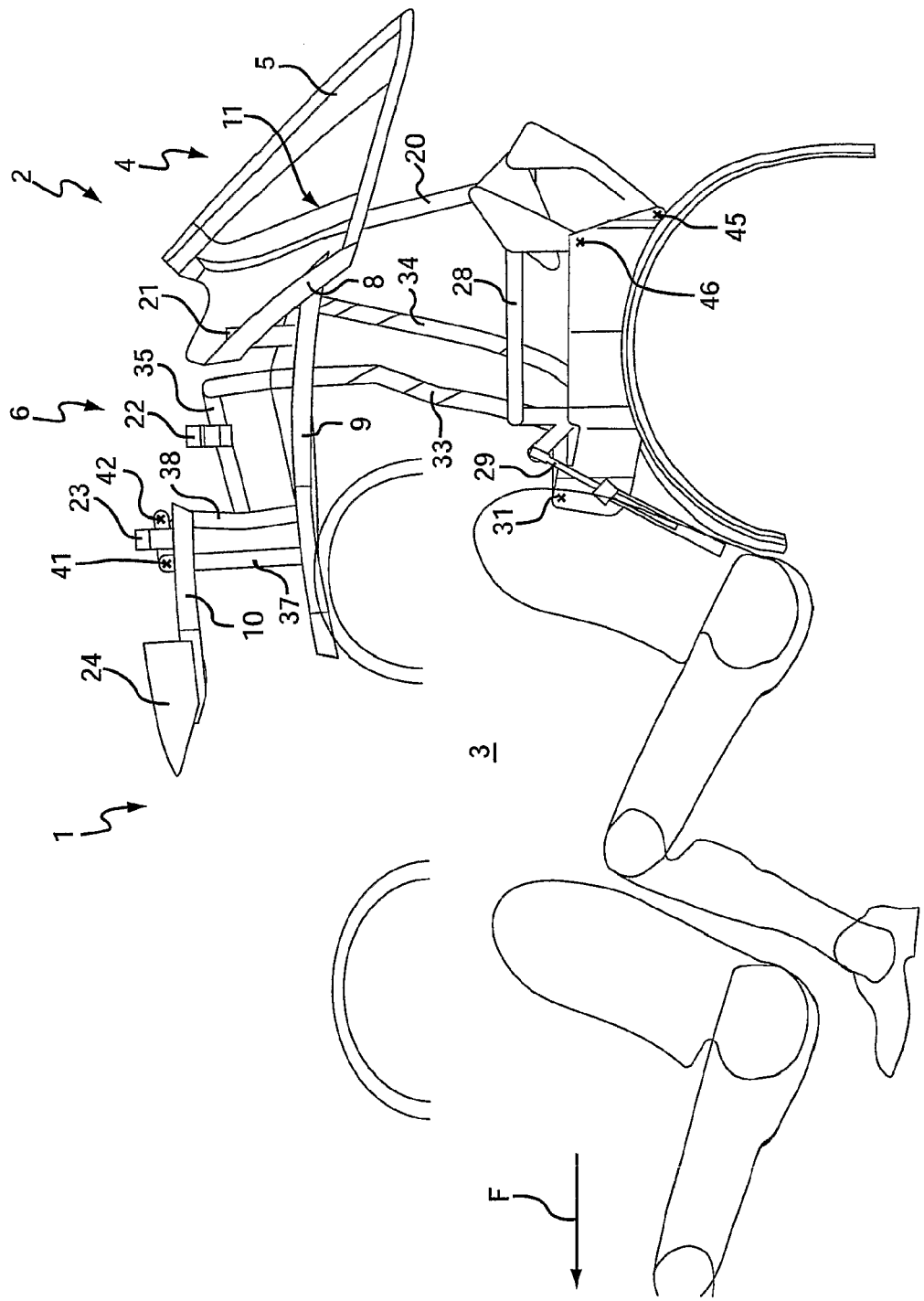
Figure 15:
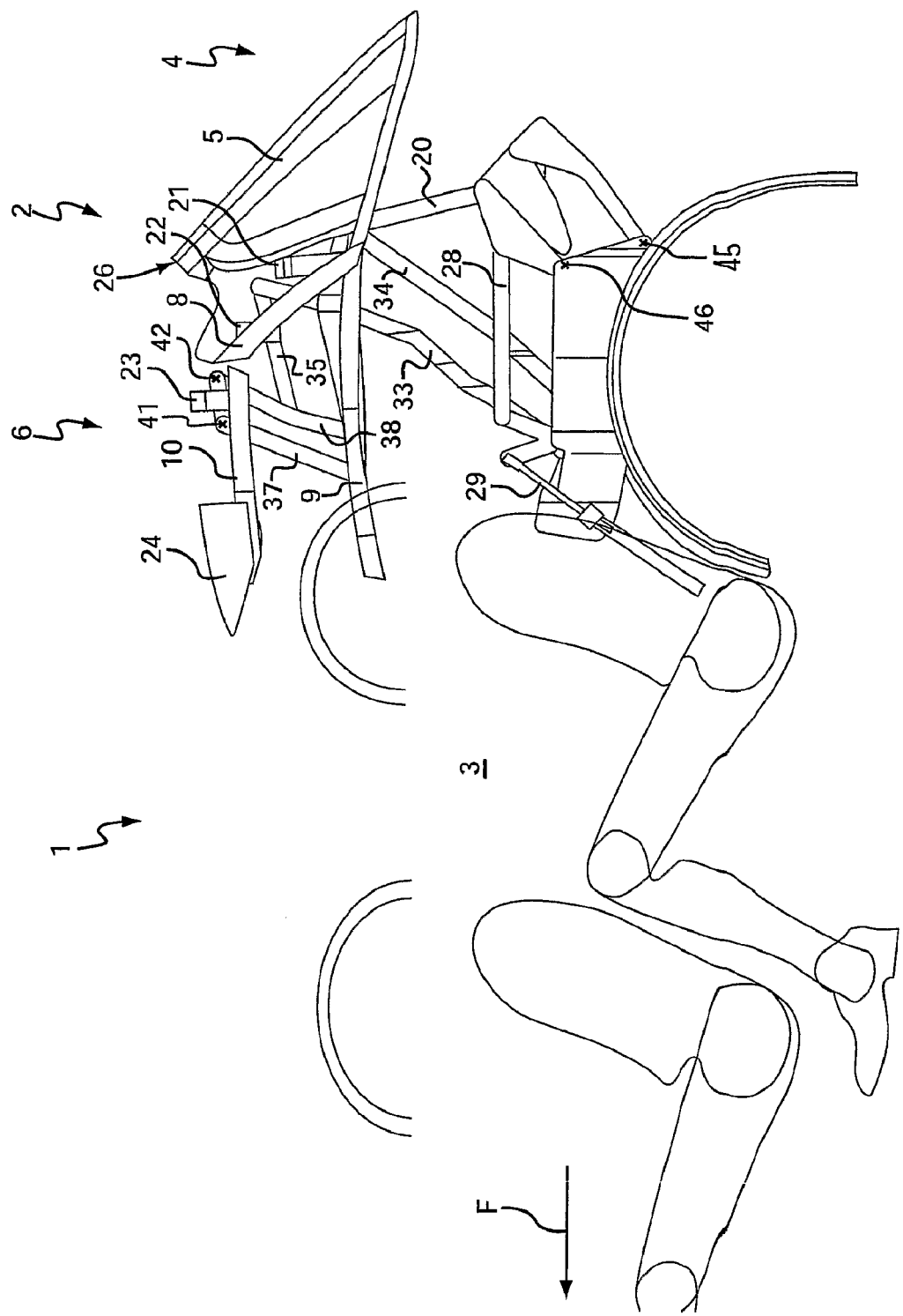
Figure 16:
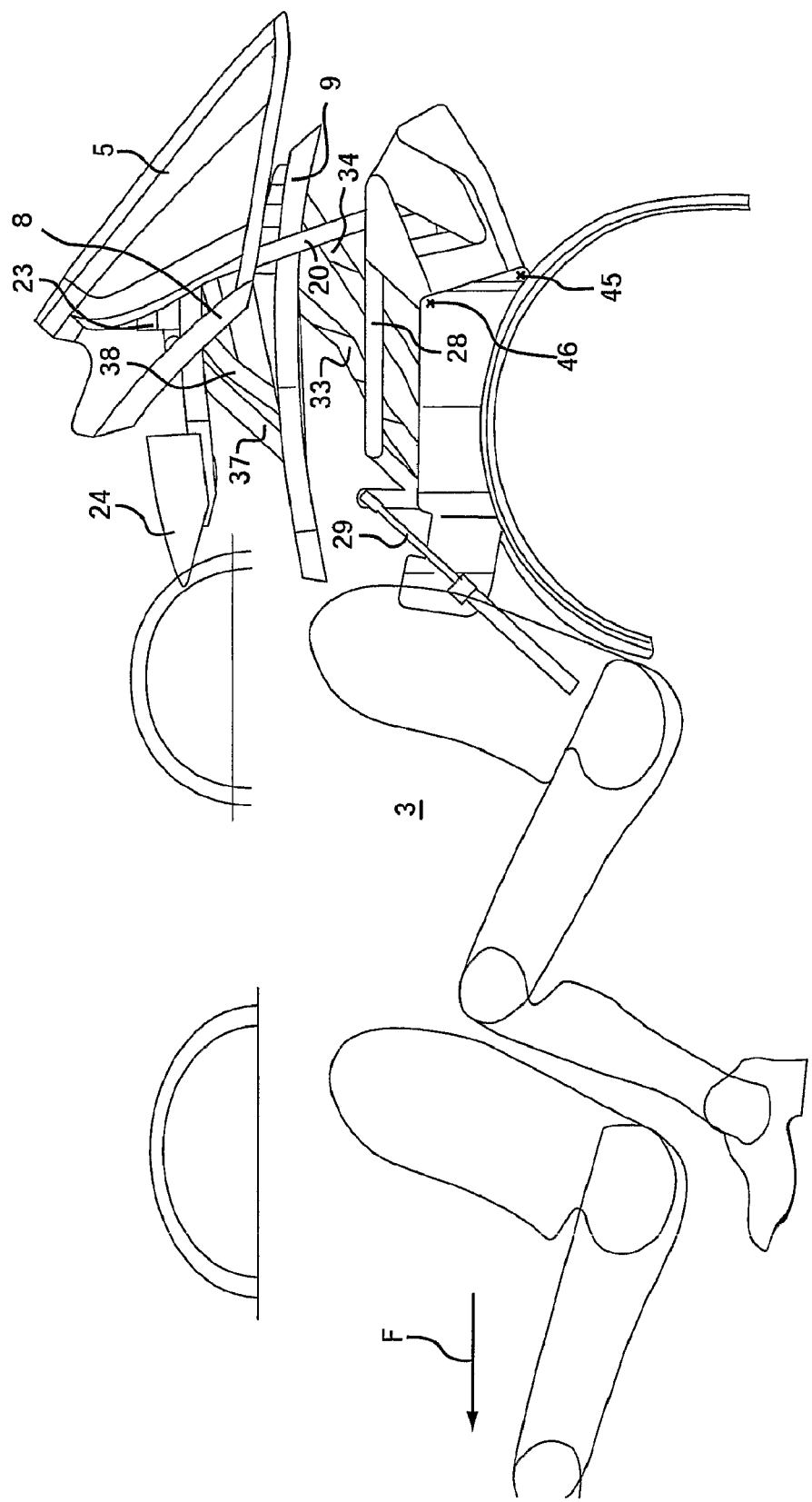
Figure 17:
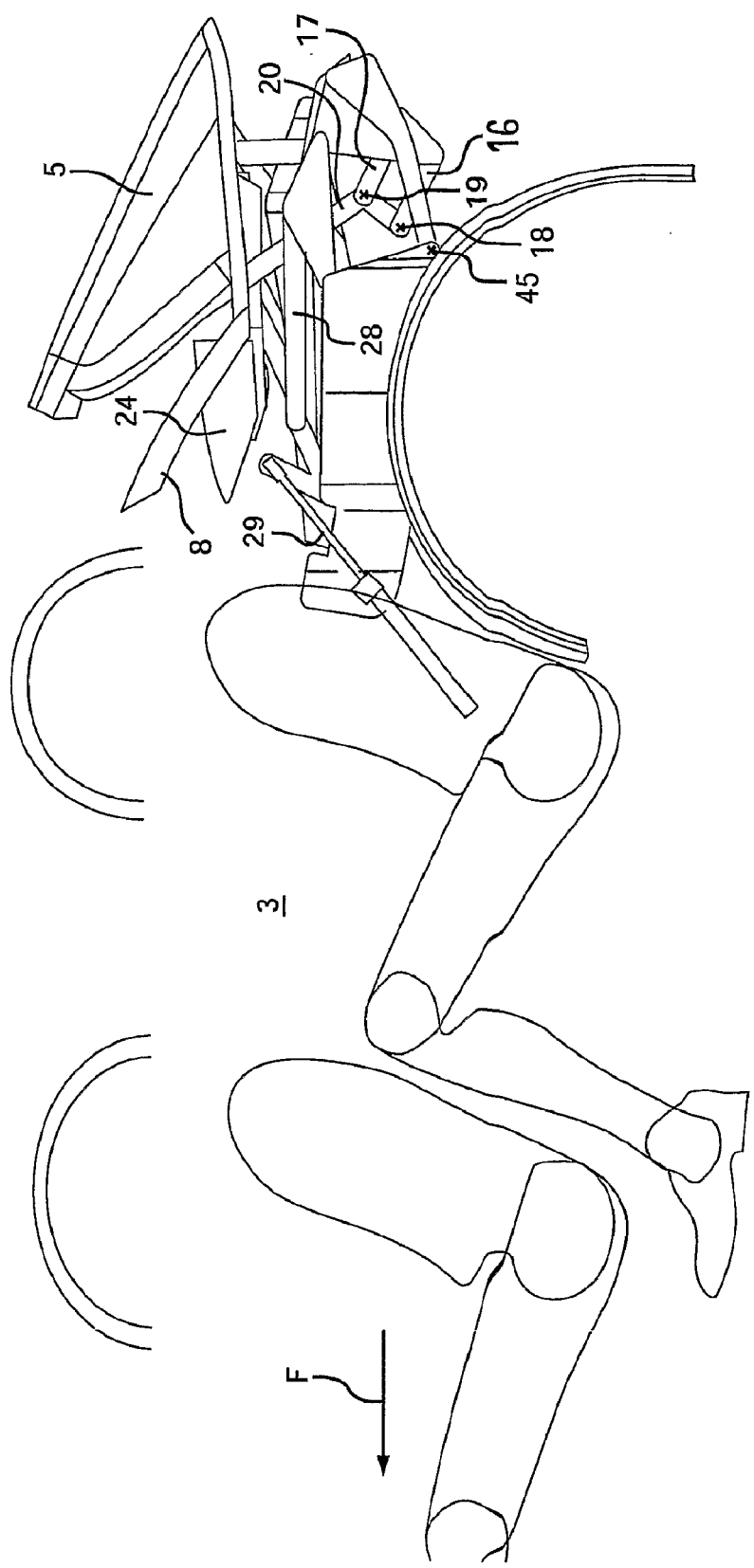

When the roof 2 is closed, the rear roof area 4 can stand on a cover part D, which is not necessary. The cover part D is a component here of a trunk lid H, which can be opened in two opposite pivot directions and in one case exposes a loading opening for a trunk and in another case a passage opening for the roof. In addition, the cover part D in the embodiment example can be pivoted relative to the trunk lid H, so that the latter need not pivot out far and a large opening can be exposed by the relative movement of cover part D with respect to the lid H (FIG. 3, FIG. 12).

When the roof is closed (FIG. 1, FIG. 10), the flexible roof area, denoted overall with 3, is connected in the direction of travel F to the rigid rear roof area 4. This includes several (here three) transverse bows 21, 22, 23 that support the covering 7. The front convertible-top transverse bow 23 is held between the frontmost side frame parts 10, which are also connected to each other through a cross-member 24, so that a roof peak, lockable on windshield frame 25, is formed. During the entire roof opening, this remains essentially in its original orientation, so that when the roof 2 is opened, it can lie tightly beneath and against the front edge 26 of the rear roof area 4, arched in the same direction, and thereby minimizes the packing dimension, especially in height.

The frontmost convertible-top transverse bow 23 in direction travel F is connected to covering 7, as are the convertible-top transverse bows 21, 22 that are movable relative to the lateral frame parts 9. The rear convertible-top transverse bow 21, held between frame parts 9 supports the covering 7, on the other hand, only when roof 2 is closed. During lateral opening, the covering 7 is released from this convertible-top bow 21. The covering 7 is therefore not directly connected to the middle frame 9, but is raised above it with lateral tightening cords to close the roof 2.

Figure 9:
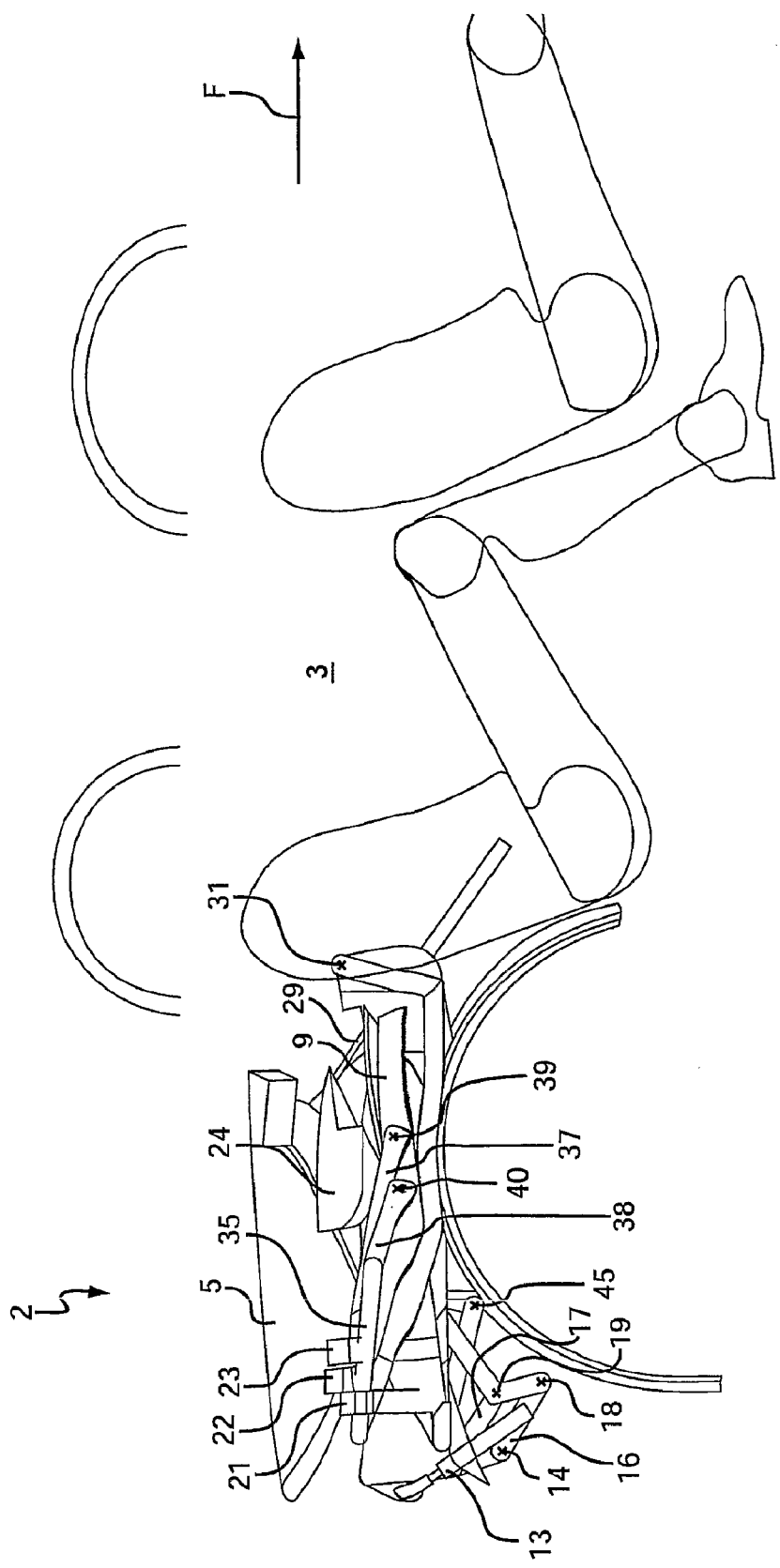
Figure 18:
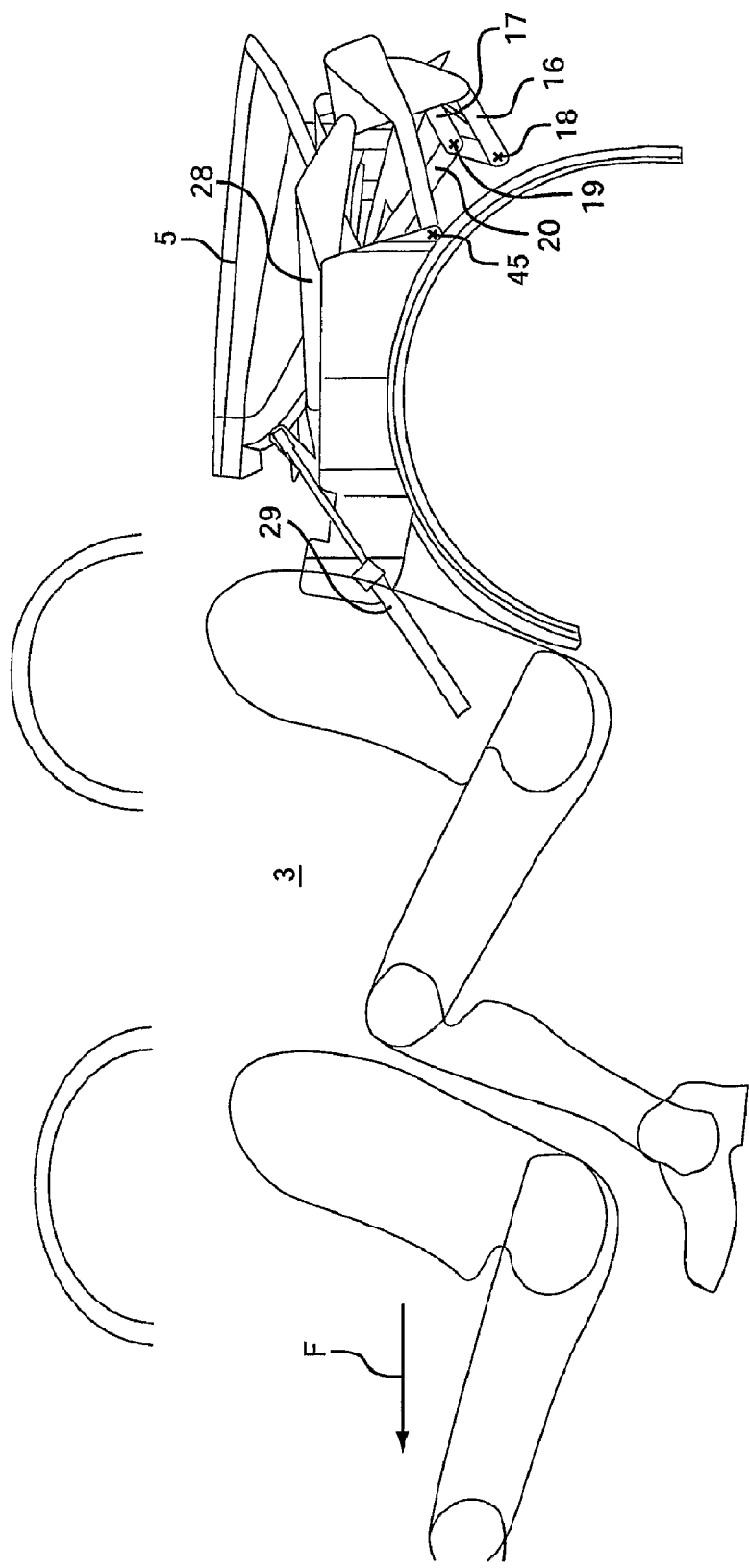

The covering 7 is therefore connected to the convertible-top transverse bows 22, which can move with respect to the lateral frame parts 9 and to the rigid rear roof area 4 on its front edge 26, in addition to the roof peak and the convertible-top transverse bow 23 connected to the frontmost frame parts 10. It can therefore freely fold in the middle area, so that the convertible-top transverse bows 21, 22, 23, when the roof is opened (FIG. 9, FIG. 18), are arranged tightly behind each other and, because of this, the total packing dimension can be minimized, especially in length.

The front roof area 6 can move through a second movement mechanism 27b, in which this is connected through a coupling rod 28 to the first rear movement mechanism. Movement of the front roof area 6 therefore always also causes movement of the rear roof area 4, which, however, is not the case in reverse, as is explained further below in detail.

The second front movement mechanism 27b includes at least one drive device 29, here also designed as a hydraulic cylinder. This acts on a first four-link suspension 30 with levers 33, 34 connected to articulations 31, 32 on the body side, by which means the middle lateral frame part 9 is secured movably. Lever 33 is lengthened so that it also operates an additional four-link suspension 36 through a longitudinal coupling 35. This connects the two front frame parts 9, 10 through two levers 37, 38. The levers 37, 38 are fastened to pivot, on one side, by means of articulations 39, 40 on the middle frame part 10 and, on the other side, by means of articulations 41, 42 on the front frame part 10. The additional convertible-top transverse bow 22, which can move with respect to frame part 9, is also secured on the longitudinal coupling 35.

Figure 2:
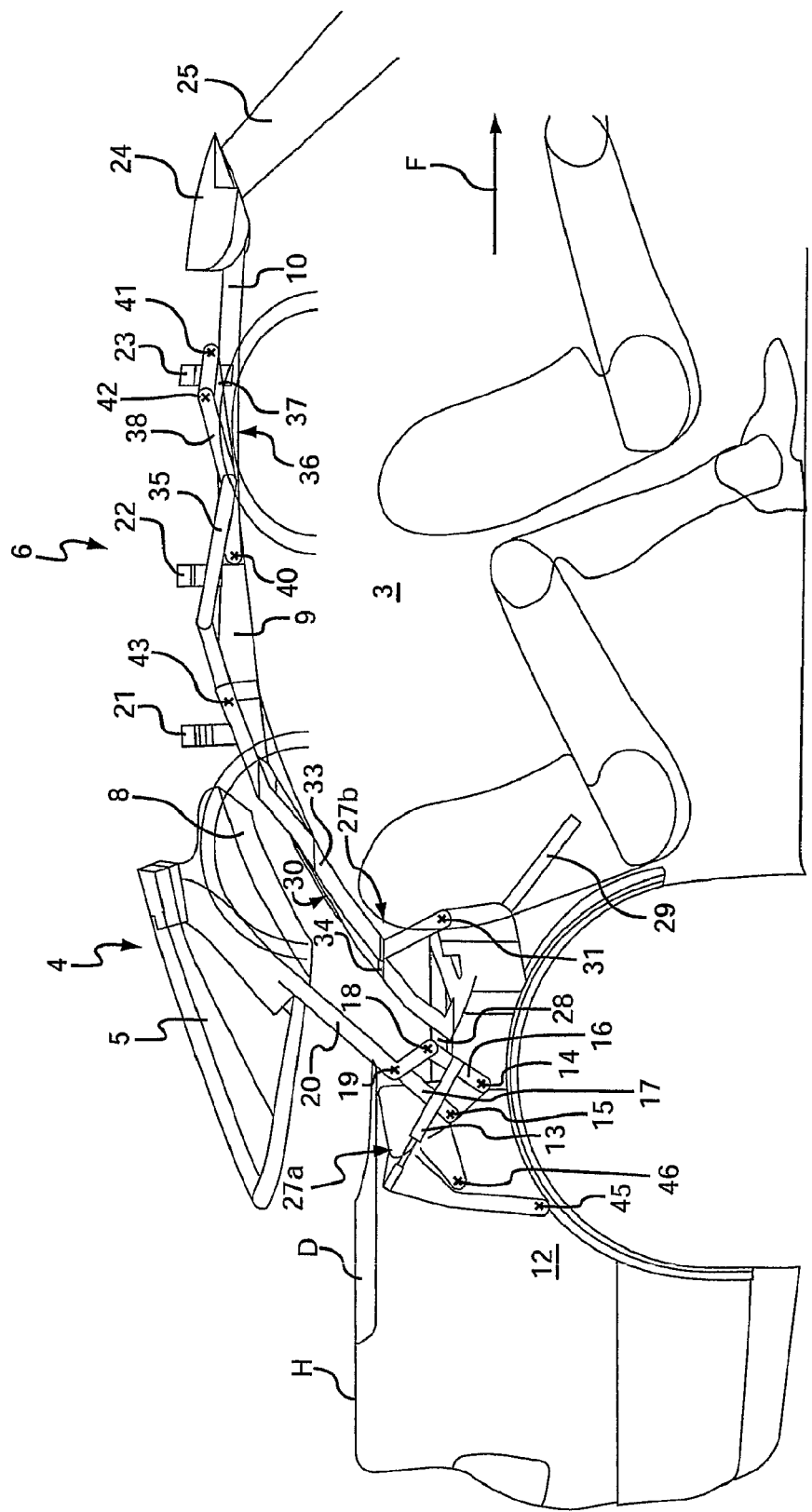
Figure 11:
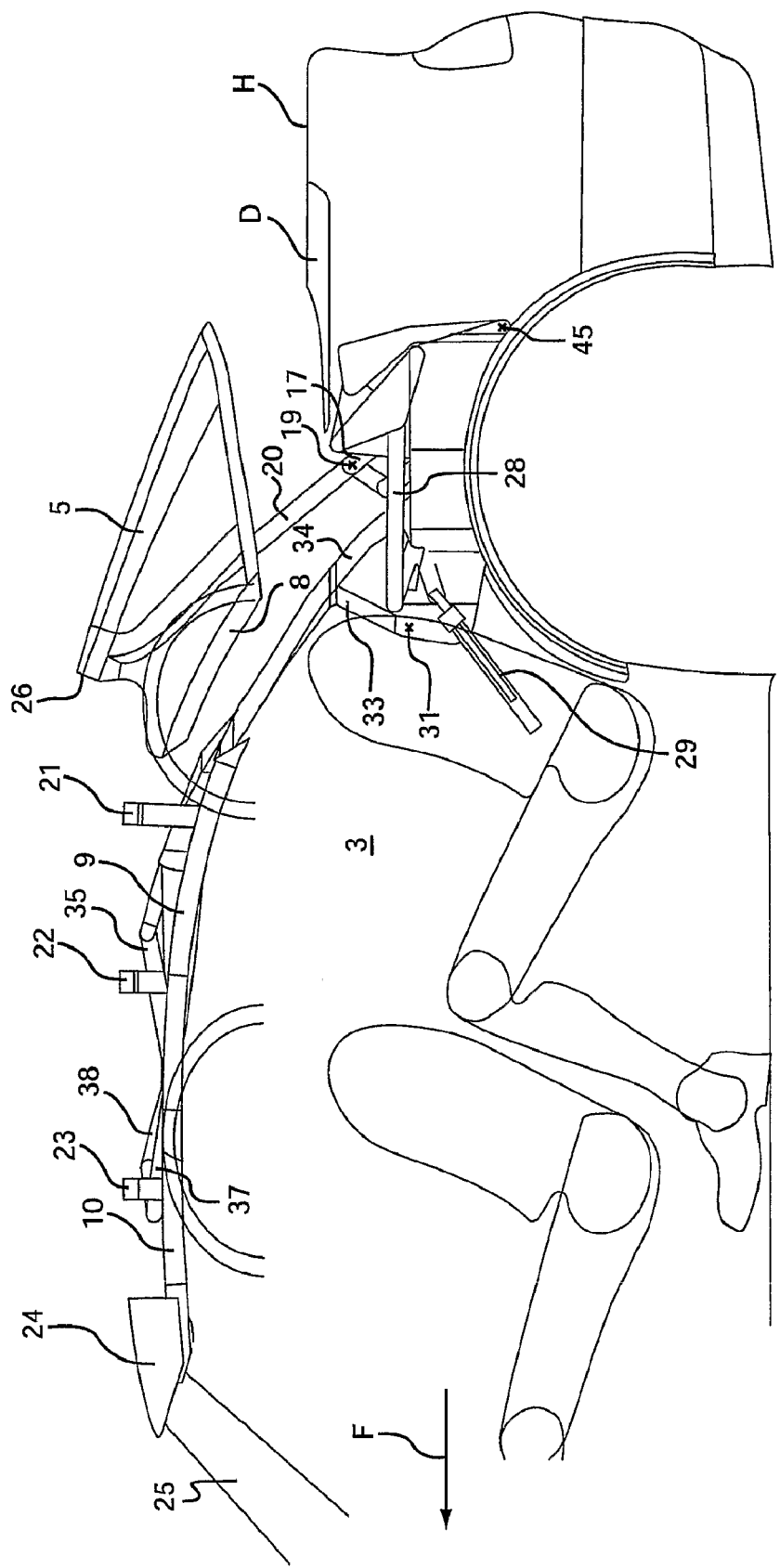

To open the roof, in a first movement phase, only the rear roof area 4 is moved (transition from FIG. 1 to FIG. 2 or from FIG. 10 to FIG. 11). For this purpose, the piston of the drive device 13 of the first movement mechanism is retracted, so that the levers or links 16, 17 pivot upward and rearward about their articulations 14, 15 and, in so doing, move the lever and therefore the entire dome-like rigid rear roof area 4 upward and rearward. Since the front lever or link 16 is pivoted out above the vertical, the rear roof area 4 readily tilts forward at the end of the first movement phase, so that the covering 7 is relieved of its connection to edge 26 (transition from FIG. 11 to FIG. 12). The front roof area 6, during this movement phase, can still remain closed. Stress on the covering 7 is avoided.

At the end of this movement phase, the cover part D opens, optionally with trunk lid H.

In the subsequent second movement phase, the front roof area 6 opens by the drive device 29 being pushed over the second movement mechanism 27b and the rear roof part 4 then being moved by the coupling rods about its horizontal axes 45, 46, which lie transverse to the vehicle 1, and were unmoved in the first movement phase. In the entire second movement phase, the rear drive device 13, however, remains in its retracted end position and therefore represents a pure coupling element.

In the second movement phase, on the one hand, the front roof area 6 can therefore move beneath the rear roof area 4 and, on the other hand, by means of coupling rod 28, the entire roof 2 can be moved synchronously and without additional drive or control demands into the stored position within the body 12.

Each movement mechanism 27a, 27b therefore includes a drive device 13, 29, and the drive device 13 of the first movement mechanism 27a remains unaffected in the second movement phase and serves merely as a coupling.

During roof opening, the roof peak with the frontmost frame parts 10 is moved by the four-link suspension 36 parallel to the middle frame parts 9 rearward and upward about axes or articulations 39, 40, 41, 42 and retains its original orientation. At the same time, it is raised, like the middle roof frame parts 9, above the four-link suspension 30 that opens around axes or articulations 31, 32, 43, 44, so that the head freedom also increases for the rear occupants during roof opening, and during the critical storage of the front cross support 24 of the roof peak, the head movement curve of the rear occupants is fully retained. The invention is therefore particularly useful for vehicles with two or more rows of seats, but also for two-seaters.

All frame parts 8, 9, 10 of the rear 4 and front 6 roof areas are therefore folded-in opposite to each other about the horizontal transverse axes or articulations 45, 46, 31, 32, 43, 44, 39, 40, 41, 42. Because of this, and through couplings 28, 35, as well as 13 in the second movement phase, the control expense is reduced. Only one drive device 13, 29 need be operated in each movement phase, which then is necessarily assigned the roof movement. Synchronization is completely unnecessary; and the movement phases can also occur fully sequentially without any overlap.

While the best modes for carrying out the invention have been described in detail, those familiar with the art to which this invention relates will recognize various alternative designs and embodiments for practicing the invention within the scope of the appended claims.

The invention claimed is:

1. A convertible vehicle (1) with at least one front roof area (6), having a flexible covering (7) in the direction of travel (F), and a rigid rear roof area (4), including a rear window (5), characterized in that the front roof area (6) includes several lateral frame parts (9; 10) lying one behind the other, which can be folded toward each other, at least in a plurality of essentially horizontal axes (31, 32, 43, 44; 39, 40, 41, 42), and can be covered by the rear roof area (4) in the stored position and that the frontmost (10) of the lateral frame parts (8; 9; 10) in the direction of travel (F) are connected via at least one cross-support (24) to a roof peak, which, in an opened roof state, is held in an unchanged orientation relative to a closed roof (2) state.

2. A convertible vehicle (1) according to claim 1, characterized in that the front roof area (6) has several lateral frame parts (9; 10) lying one behind the other, and a rearmost lateral frame part (8) is a component of the rigid rear roof area (4).

3. A convertible vehicle according to claim 1, characterized in that the lateral frame parts (8; 9; 10) support the covering (7) through transverse convertible-top bows (21; 22; 23), in which at least one convertible-top bow (21) connected to the next to last frame part (9) is arranged in front of the rearmost frame part (8) and passes beneath the covering (7) when the roof is closed (2) and is released from it during roof opening.

4. A convertible vehicle according to claim 3, characterized in that the roof (2) includes three lateral frame parts (8; 9; 10) and the covering (7) is only connected to the frontmost (10) of these parts by means of a convertible-top bow connection (23).

5. A convertible vehicle according to claim 4, characterized in that the covering is connected to a roof peak, to a convertible-top bow (22), which can move with respect to the lateral frame parts (9) and to the rigid roof area (4) on its upper edge (26) and rear frame part (8), in addition to a convertible-top bow (23) connected to the frontmost (10) of the frame parts.

6. A convertible vehicle according to claim 1, characterized in that the rear roof area (4) is formed in the manner of a dome and has a transverse extent (11) of the rear window (5) that reaches a lateral outside area of the dome.

7. A convertible vehicle according to claim 1, characterized in that to open the roof, in a first movement phase, the rear roof area (4) can be moved by means of a first movement mechanism (27a) with a lever (20), with the front roof area (6) still closed, and, wherein the position of the rear roof area (4) after the movement of the first movement mechanism (27a), a cover part (D) that covers a storage space for the stored roof (2) opens, and then in the second movement phase the front roof area (6) can be moved by means of a second movement mechanism (27b) beneath the rear roof area (4) and, together with it, into the stored position within a body.

8. A convertible vehicle according to claim 7, characterized in that each movement mechanism (27a; 27b) includes a drive device (13; 29), and the drive device (13) of the first movement mechanism (27a) is not operated in the second movement phase and serves as a coupling.

9. A convertible vehicle according to claim 7, characterized in that both movement mechanisms (27a; 27b) are connected to each other through a coupling (28).

10. A convertible vehicle according to claim 7, characterized in that the first movement mechanism (27a) includes a four-link suspension (14; 15; 18; 19) to move the rear roof area (4).

11. A convertible vehicle (1) with at least one front roof area (6), having a flexible covering (7) in the direction of travel (F), and a rigid rear roof area (4), including a rear window (5), characterized in that the at least one front roof area (6) includes several lateral frame parts (9; 10) lying one behind the other, which can be folded toward each other, at least in a plurality of essentially horizontal axes, and where the lateral frame parts (9; 10) can be covered by the rear roof area (4) in the stored position; and wherein the lateral frame parts (8; 9; 10) support the covering (7) through transverse convertible-top bows (21; 22; 23), in which at least one convertible-top bow (21) connected to the next to last frame part (9) is arranged in front of the rearmost frame part (8) and passes beneath the covering (7) when the roof is closed (2) and is released from it during roof opening.

12. A convertible vehicle according to claim 11, characterized in that the roof (2) includes three lateral frame parts (8; 9; 10) and the covering (7) is only connected to the frontmost (10) of these parts by means of a convertible-top bow connection (23).

13. A convertible vehicle according to claim 12, characterized in that the covering is connected to a roof peak, to a convertible-top bow (22), which can move with respect to the lateral frame parts (9) and to the rigid roof area (4) on its upper edge (26) and rear frame part (8), in addition to a convertible-top bow (23) connected to the frontmost (10) of the frame parts.

14. A convertible vehicle (1) with at least one front roof area (6), having a flexible covering (7) in the direction of travel (F), and a rigid rear roof area (4), including a rear window (5),
characterized in that the at least one front roof area (6) includes several lateral frame parts (9; 10) lying one behind the other, which can be folded toward each other, at least in a plurality of essentially horizontal axes, and wherein the lateral frame parts can be covered by the rear roof area (4) in a stored position;
wherein to open the roof, in a first movement phase, the rear roof area (4) can be moved by a first movement mechanism (27*a*) with the front roof area (6) still closed, with an upward component and, in the position after the movement, a cover part (D) that covers a storage space for the stored roof (2) opens, and then
in a second movement phase the front roof area (6) can be moved by a second movement mechanism (27*b*) beneath the rear roof area (4) and, together with the second movement mechanism (27*b*), into the stored position within a body.

15. A convertible vehicle according to claim 14, characterized in that each movement mechanism (27*a*; 27*b*) includes a drive device (13; 29), and the drive device (13) of the first movement mechanism (27*a*) is not operated in the second movement phase and serves as a coupling.

16. A convertible vehicle according to claim 14, characterized in that both movement mechanisms (27*a*; 27*b*) are connected to each other through a coupling (28).

17. A convertible vehicle according to claim 14, characterized in that the first movement mechanism (27*a*) includes a four-link suspension (14; 15; 18; 19) to move the rear roof area (4).

18. A convertible vehicle (1) with at least one front roof area (6), having a flexible covering (7) in the direction of travel (F), and a rigid rear roof area (4), including a rear window (5),
characterized in that the at least one front roof area (6) includes several lateral frame parts (9; 10) lying one behind the other, which can be folded toward each other, at least in a plurality of essentially horizontal axes, and wherein the lateral frame parts can be covered by the rear roof area (4) in a stored position;
wherein to open the roof, in a first movement phase, the rear roof area (4) can be moved by a first movement mechanism (27*a*), by a lever (20), with the front roof area (6) still closed and, wherein the position of the rear roof area (4) after the movement by the first movement mechanism (27*a*), a cover part (D) that covers a storage space for the stored roof (2) opens, and
in a second movement phase the front roof area (6) can be moved by a second movement mechanism (27*b*) beneath the rear roof area (4) and, together with the second movement mechanism (27*b*), into the stored position within a body.

* * * * *